United States Patent [19]

Jye

[11] Patent Number: 5,544,780
[45] Date of Patent: Aug. 13, 1996

[54] POWER GAS TANK COVER

[76] Inventor: Cherng B. Jye, P.O. Box 82-144, Taipei, Taiwan

[21] Appl. No.: 312,399

[22] Filed: Sep. 26, 1994

[51] Int. Cl.$^6$ ............................................. B65D 55/00
[52] U.S. Cl. ...................... 220/211; 220/253; 220/262; 220/86.2; 220/DIG. 33; 292/251; 292/263; 292/DIG. 25; 296/97.22
[58] Field of Search ................................ 220/211, 253, 220/262, 86.2, 86.3, DIG. 33; 292/251, 263, DIG. 25; 296/97.22

[56] References Cited

U.S. PATENT DOCUMENTS

| | | | |
|---|---|---|---|
| 4,474,393 | 10/1984 | Kimura | 292/171 |
| 4,986,097 | 1/1991 | Derman | 220/253 X |
| 5,066,062 | 11/1991 | Sekulovski | 296/97.22 |
| 5,123,574 | 6/1992 | Poulos | 220/253 X |
| 5,234,122 | 8/1993 | Cherng | 220/211 |

FOREIGN PATENT DOCUMENTS 54796  4/1950  France .................................. 220/253

Primary Examiner—Stephen Cronin
Attorney, Agent, or Firm—Alfred Lei

[57] ABSTRACT

A power gas tank cover including a motor, a collar including an annular portion, a tubular portion formed at one side of the annular portion and having a hole communicated with an opening of the annular portion, a recess between the annular portion and the neck portion, and an inclined track on an inner side of the neck portion, a worm shaft inserted into the tubular portion and connected with the motor, a sleeve fitted in the inclined track, an inner jacket being a cone-shaped member with a first orifice, an outer jacket rotatably fitted on the inner jacket and provided at a lower portion with a worm gear meshed with the worm shaft, a pressure relief valve arranged on a top of said inner jacket, and a transmission shaft pivotally connected with the outer jacket at an end and with a gas tank door at another.

5 Claims, 6 Drawing Sheets

POWER GAS TANK COVER

BACKGROUND OF THE INVENTION

It has been found that the driver must get off the automobile to manually open the gas tank door in order to fill gasoline thereby causing much inconvenience. Hence, it has been taught to use a lever disposed near the driver's seat to control the opening of the gas tank door. However, it is still necessary for the driver or somebody else to manually close the gas tank door and open and close the gas tank cap.

Therefore, it is an object of the present invention to provide a power gas tank cover which can obviate and mitigate the above-mentioned drawbacks.

SUMMARY OF THE INVENTION

This invention relates to a power gas tank cover.

It is the present invention to provide a power gas tank cover which can control the opening and closing of a gas tank cover as desired.

It is another object of the present invention to provide a power gas tank cover which can open and close the gas tank cover of an automobile simply by pressing a switch near the driver seat.

It is still another object of the present invention to provide a power gas tank cover which is facile to operate.

It is still another object of the present invention to provide a power gas tank cover which is simple in construction.

It is a further object of the present invention to provide a power gas tank cover which is practical in use.

Other objects and merits and a fuller understanding of the present invention will be obtained by those having ordinary skill in the art when the following detailed description of the preferred embodiment is read in conjunction with the accompanying drawings wherein like numerals refer to like or similar parts.

BRIEF DESCRIPTION OF THE DRAWINGS

FIG. 8 is a sectional view of the present invention.

DETAILED DESCRIPTION OF THE PREFERRED EMBODIMENT

Figure 1:
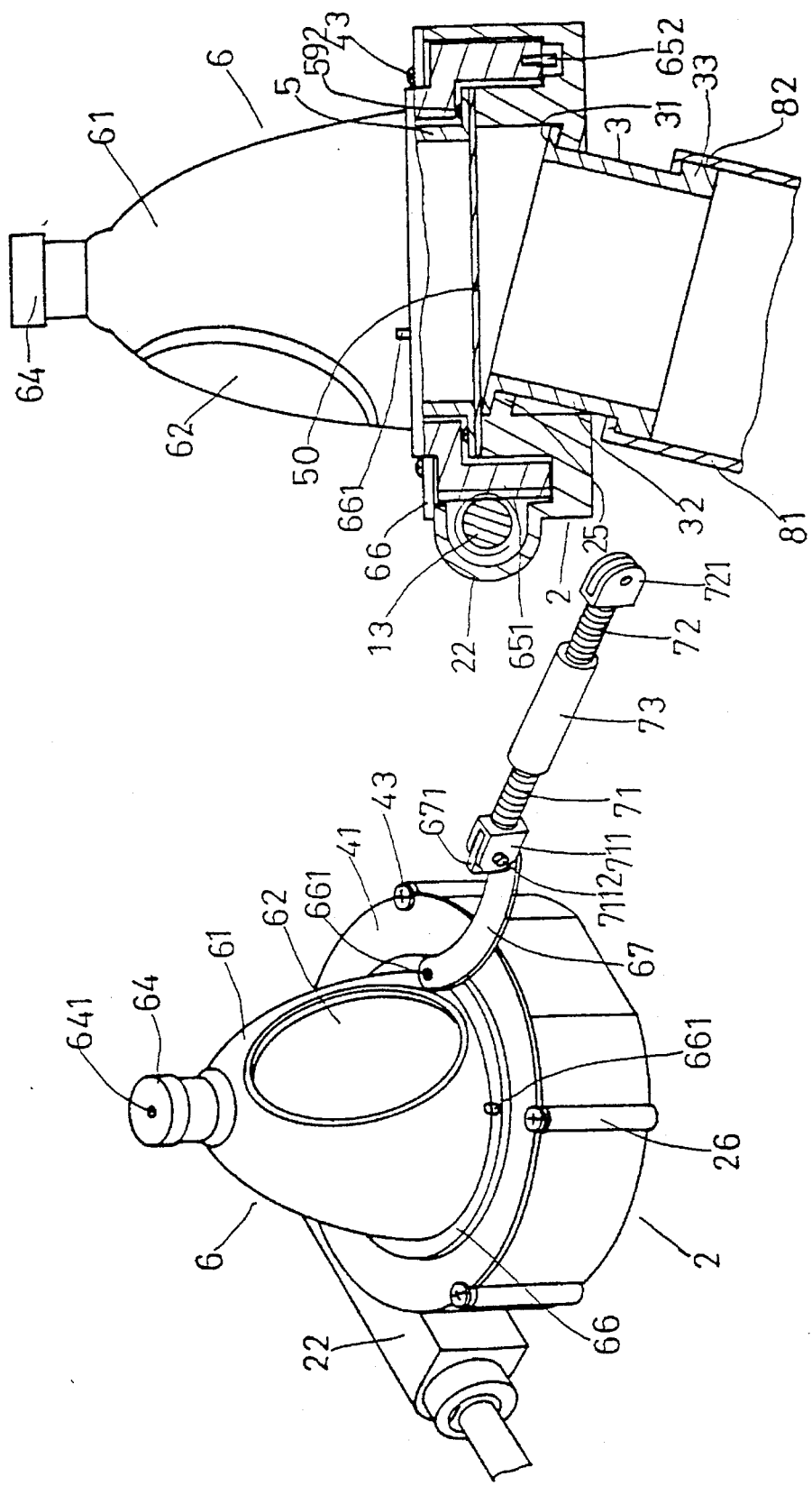
FIG. 1 is a perspective view of the present invention.

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
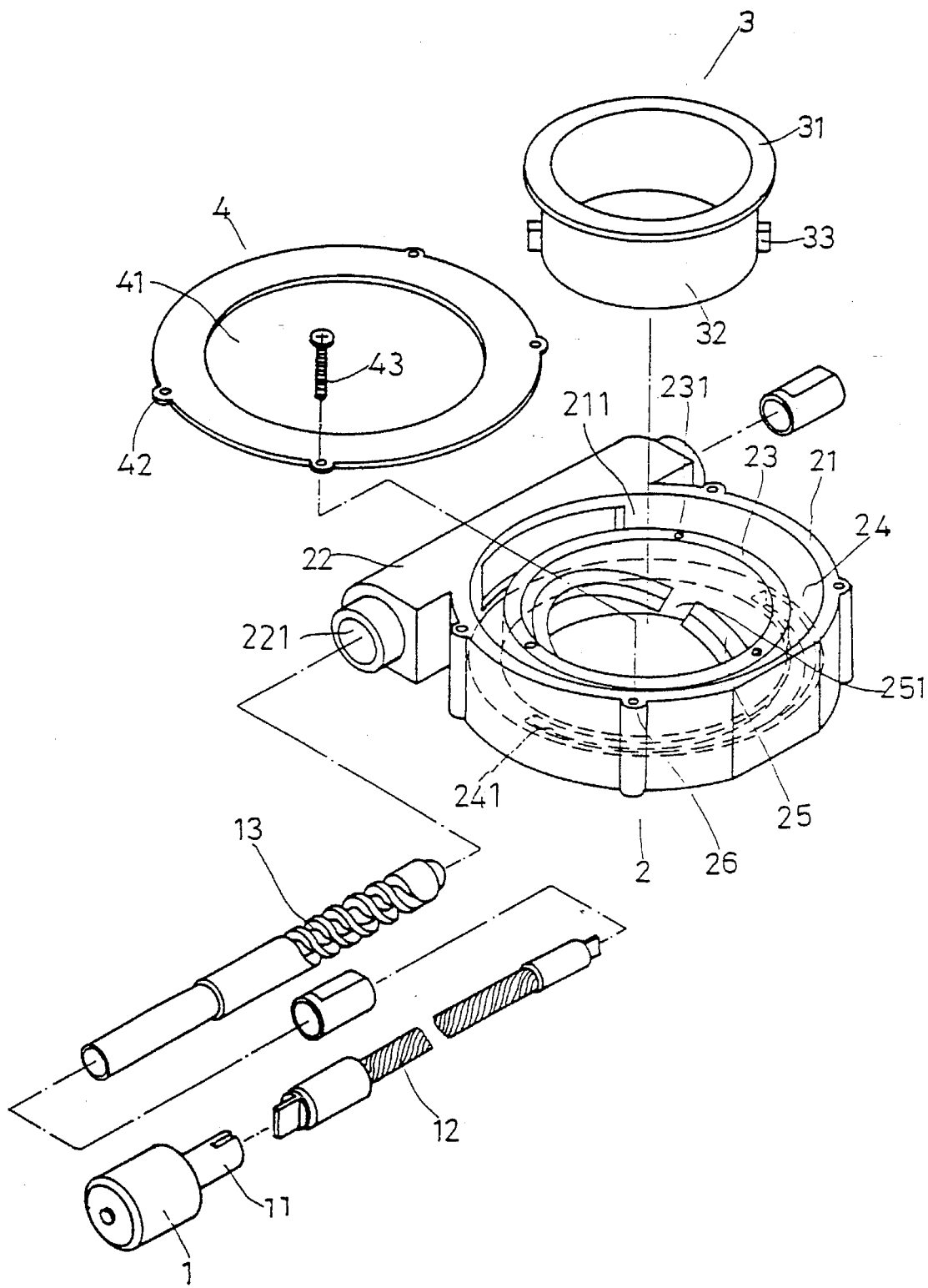
FIG. 2 is a partial exploded view of the present invention.
Figure 3:
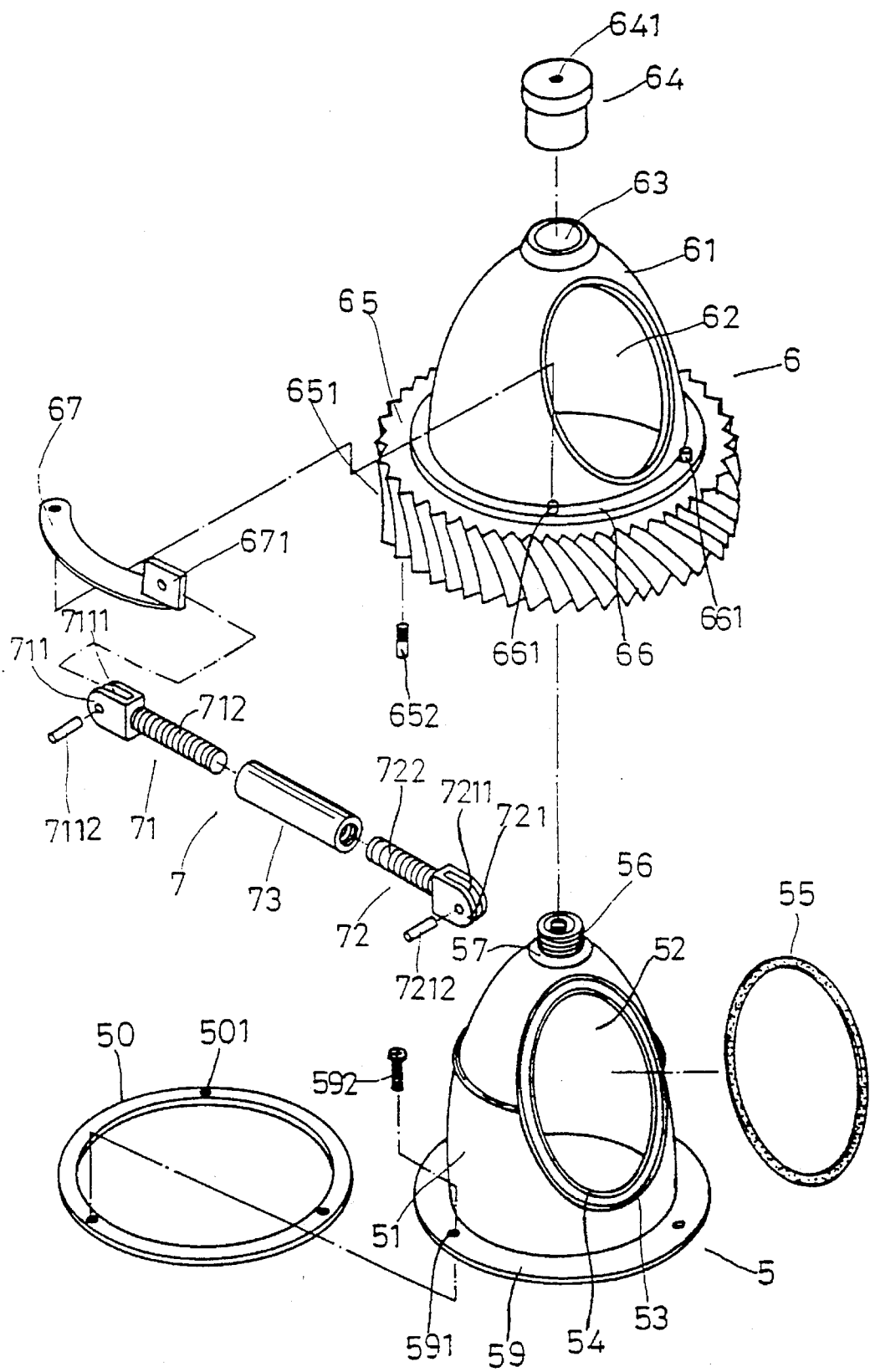
FIG. 3 is another partial exploded view of the present invention.

With reference to the drawings and in particular to FIGS. 1, 2 and 3 thereof, the power gas tank cover for automobiles according to the present invention comprises a motor 1, a collar 2, a sleeve 3, a packing ring 4, an inner jacket 5, an outer jacket 6, and a transmission shaft 7. The motor 1 has an axle 11 connected with a cable 12 which is in turn connected with a worm shaft 13. The collar 2 includes an annular portion 21 and a tubular portion 22 formed at one side of the annular portion 21. The tubular portion 22 has a hole 221 communicated with an opening 211 of the annular portion 21 so that when the worm shaft 13 is inserted into the hole 221 of the tubular portion 22, the worm shaft 13 will partially extend into the opening 211 of the annular portion 21. Further, the collar 2 has a neck portion 23 provided with a plurality of threaded holes 231 thereby forming an annular recess 24 between the annular portion 21 and the neck portion 23. On the bottom of the annular recess 24 is formed a semi-circular groove 241. The neck portion 23 is formed at the inner side with an inclined track 25 having two opposite notches 251. The outer side of the annular portion 21 is provided with a plurality of lugs 26 each with a threaded hole.

The sleeve 3 includes a tubular portion 32 with a flange 31 on the top and two opposite protuberances 33 on the outer vertical side. The outer diameter of the flange 32 is the same as the outer diameter of the inclined track 25, while the outer diameter of the tubular portion 32 is the same as the inner diameter of the inclined track 25 so that the sleeve 3 can be fitted into the inclined track 25 with the protuberances 33 engaged with the corresponding notches 251.

The packing ring 4 has the same outer diameter as the annular portion 21 and a plurality of ears 42 aligned with the lugs 26 of the annular portion 21. Further, the packing ring 4 has an opening 41 at the central portion.

Figure 5:
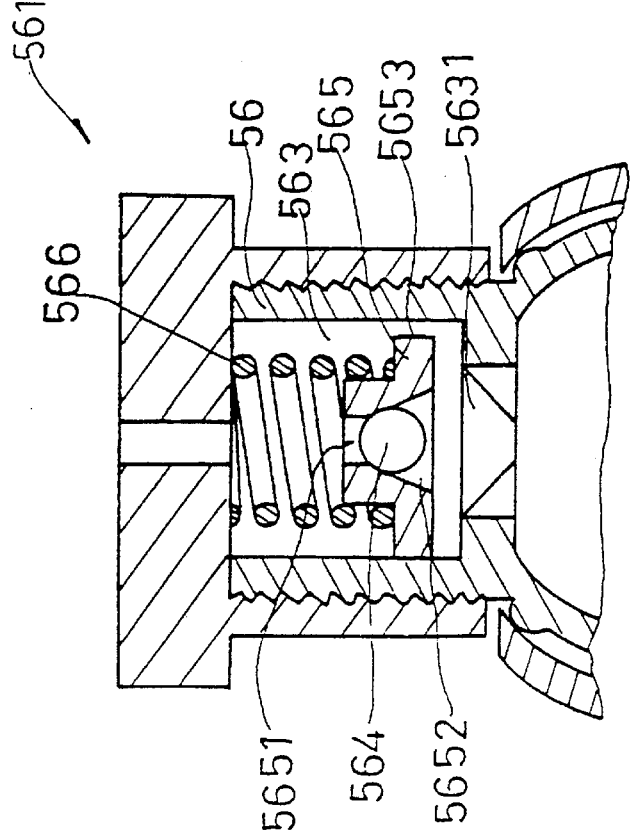
FIG. 5 shows the working principle of the pressure relief valve.

The inner jacket 5 is a cone-shaped member 51 with an orifice 52 enclosed with an inner flange 54 and an outer flange 53. A rubber ring 55 is fitted between the inner flange 54 and the outer flange 53. The top of the inner jacket 5 has a neck 56 in which is fitted a pressure relief valve 561 (see FIGS. 4 and 5). The neck 56 is formed with external threads. Between the neck 56 and the cone-shaped member 51 there is a circular protrusion 57. Further, the cone-shaped member 51 has a flange 59 at the lower edge which is provided with a plurality of threaded holes 591 so that when the inner jacket 5 is mounted on the base 2, the threaded holes 591 are aligned with the threaded holes 231. A packing ring 50 with threaded holes 501 aligned with the threaded holes 591 is disposed under the flange 59 of the inner jacket 5.

The outer jacket 6 is also a cone-shaped member 61 rotatably fitted on to the inner jacket 5. The cone-shaped member 61 has an orifice 62 which will align with the orifice 52 of the inner jacket 5 when the outer jacket 6 is rotated to a predetermined position. The top of the cone-shaped member 61 has an opening 63 through which a plug 64 extends to threadedly engage the neck 56 of the inner jacket 5. The plug 64 is formed with a ventilation hole 641 at the center. The outer jacket 6 is provided at the lower portion with a worm gear 65 with a plurality of teeth 651. A positioning pin 652 is arranged on the bottom of the worm gear 65. Between the cone-shaped member 61 and the worm gear 65 there is a raised portion 66 on which are fitted two pins 661 each located at one side of the orifice 62. One of the pins 661 is connected with an end of a lever 67.

Figures 6, 6A:
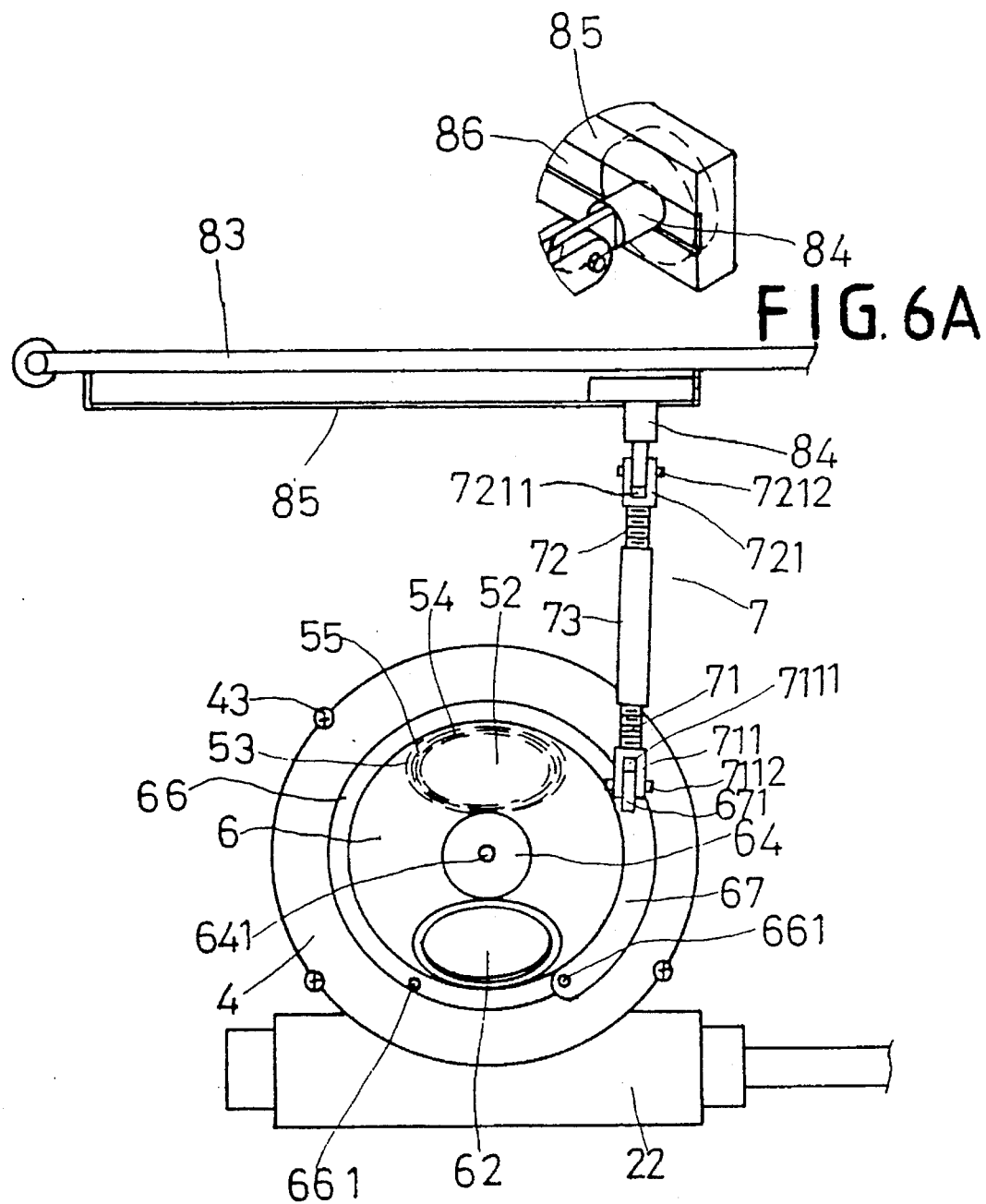
FIG. 6 shows the present invention in a closed position.
FIG. 6A is an enlarged fragmentary view of the present invention.
Figure 7:
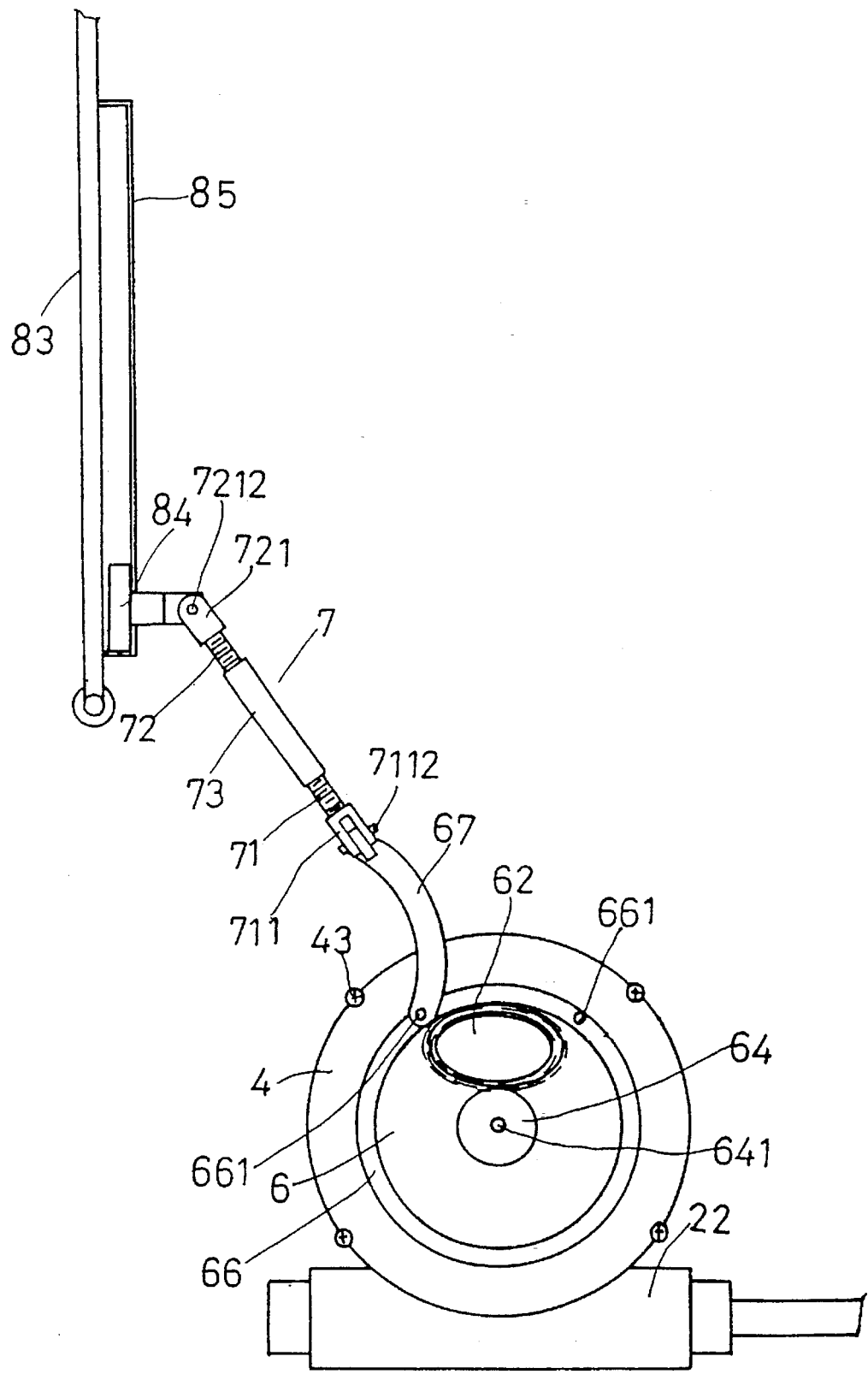
FIG. 7 shows the present invention in an open position.

The transmission shaft 7 is made up of two screw rods 71 and 72 and an internally threaded tubular member 73. The screw rod 71 is provided at an end with a joint 711 having a slot 7111 in which is pivotally fitted an end 671 of the lever 67 by a pin 7112. The threaded portion 712 of the screw rod 71 is engaged with the tubular member 73. The threaded portion 722 of the screw rod 72 is engaged with the tubular member 73. The screw rod 72 has a joint 721 having a slot 7211 in which is pivotally fitted a slider 84 (see FIG. 7) by a pin 7212. The slider 84 is slidably fitted in a rack 85 provided on the inner side of a gas tank door 83 of an automobile (see FIG. 6A).

Figure 4:
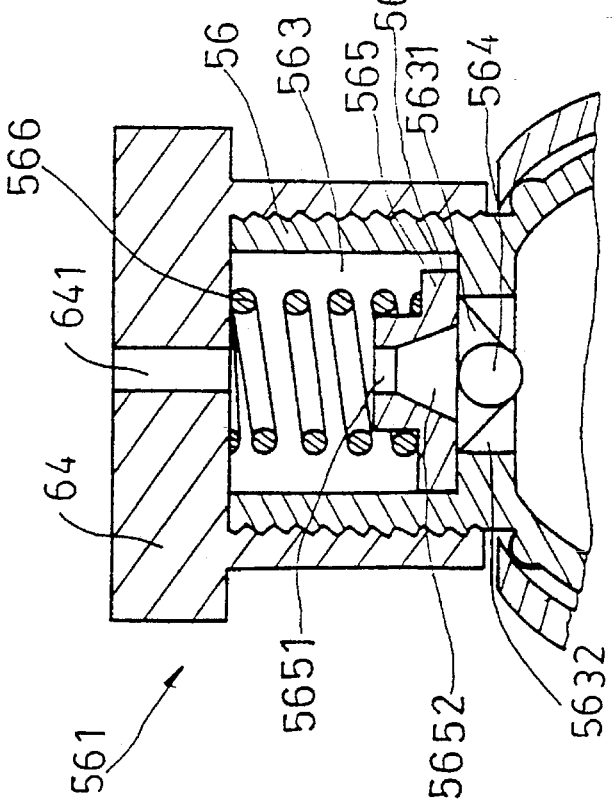
FIG. 4 is a sectional view of the pressure relief valve.

Referring now to FIG. 4, the pressure relief valve 561 is made up of a spring 566, a plug 565 and a ball 564 which are fitted in a hole 563 of the neck 56. The neck 56 has an inverted conical hole 5631 under the hole 563. The neck 56 is formed with a passage 5632 which is communicated with the inverted conical hole 5631. The plug 565 is formed with a cylindrical hole 5651 and a conical hole 5652 under the cylindrical hole 5651. The spring 566 is mounted on the plug 565 which has a notch 5653. The ball 564 is arranged in the conical hole 5631. The plug 64 is formed with a central hole 641 and threadedly engaged with the neck 56 thereby keeping the pressure relief valve 561 therein.

When the gas in the gas tank is reduced in volume, air will first flow through the ventilation hole 641 of the plug 64 into the hole 563 of the neck 56, and then flow into the gas tank through the cylindrical hole 5651, the conical hole 5652 and the passage 5632 thereby balancing the pressure inside and outside the gas tank (not shown). As the temperature in the gas tank is increased, the pressure in the gas tank will push the ball 564 upwardly into the inverted conical hole 5652 thereby opening the conical opening 5631 and enabling air to flow out of the gas tank and therefore balancing the pressure inside and outside the gas tank (see FIG. 5). Then, the spring 566 will push the ball downwardly to block the conical hole 5631 of the inner jacket 5.

Turning to FIG. 8, there is shown the connection between the gas tank inlet 81 and the present invention. As illustrated, the sleeve 3 is fitted in the gas tank inlet 81 with the protuberances 33 of the sleeve 3 with the slots 82 of the inlet 81. Further, the motor 1 is electrically connected with the power supply (not shown) of an automobile and controlled by a switch (not shown) which can be conveniently near the driver's seat (not shown).

When desired to open the gas tank door 83 (see FIGS. 6 and 7), it is only necessary to turn on the motor 1. As the motor 1 is turned on, the worm shaft 13 will drive the worm gear 65 to rotate thereby moving the positioning pin 652 along the semi-circular groove 241. As the positioning pin 652 contacts the first end of the semi-circular groove 241, the orifice 62 of the outer jacket 6 will be aligned with the orifice 52 of the inner jacket 5 and the motor 1 will be turned off by a first micro-switch (not shown) mounted at the first end of the semi-circular groove 241. The connection between the first micro-switch and the motor 1 may be of any conventional design well known to those skilled in the art and is not considered a part of the invention. In the meantime, the slider 84 will be pushed to move along the bottom panel 85 hence opening the gas tank door 83 and therefore enabling a pump nozzle (not shown) to be inserted into the gas tank inlet 81.

When desired to close the gas tank door 83 (see FIGS. 6 and 7), simply press the switch to cause the motor 1 to rotate in a reverse direction. As the motor 1 is turned on, the worm shaft 13 will drive the worm gear to rotate thereby moving the positioning pin 652 to the second end of the semi-circular groove 241. Then, the orifice 62 of the outer jacket 6 will be no longer aligned with the orifice 52 of the inner jacket 5 and the motor 1 will be turned off by a second micro-switch mounted at a second end of the semi-circular groove 241. Also, the connection between the second micro-switch and the motor 1 may be of any conventional design well known to those skilled in the art and is not considered a part of the invention. Meanwhile, the slider 84 will be pushed to move along the track 85 of the gas tank door 83 hence closing the gas tank door 83.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A power gas tank cover comprising:

a motor;

a collar including an annular portion, a tubular portion formed at one side of the annular portion and having a hole in communication with an opening of the annular portion, a recess between the annular portion and a neck portion, and an inclined track on an inner side of the neck portion, said recess having a semi-circular groove;

a worm shaft inserted into said tubular portion and connected with said motor;

a sleeve fitted in said inclined track;

an inner jacket which is a cone-shaped member with a first orifice and fixedly mounted on said collar;

an outer jacket which is a cone-shaped member and rotatably fitted on said inner jacket and provided at a lower portion with a worm gear meshed with said worm shaft, said outer jacket having a second orifice which will align with the first orifice of said inner jacket when said outer jacket is rotated to a predetermined position, said worm gear being provided at a bottom with a positioning pin adapted to be received in the semi-circular groove of said recess;

a pressure relief valve arranged on a top of said inner jacket; and a transmission shaft having a first end pivotally connected with said outer jacket and a second end pivotally connected with a gas tank door.

2. The power gas tank cover as claimed in claim 1, wherein said inclined track has two opposite notches and said sleeve has two opposite protuberances adapted to go through the two notches of said inclined track.

3. The power gas tank cover as claimed in claim 1, wherein said sleeve has at a top a flange adapted to be mounted on said inclined track.

4. The power gas tank cover as claimed in claim 1, wherein said inner jacket has two flanges around the first orifice between which is fitted a rubber ring.

5. The power gas tank cover as claimed in claim 1, further comprising a cable connecting said motor with said worm shaft.

\* \* \* \* \*